(12) United States Patent
Kallio et al.

(10) Patent No.: US 6,533,988 B2
(45) Date of Patent: Mar. 18, 2003

(54) ROTATIONAL MOULDING PROCESS OF ETHYLENE POLYMERS OR COPOLYMERS HAVING A CONTROLLED PARTICLE SIZE AND MORPHOLOGY

(75) Inventors: Kalle Kallio, Vanhakya (FI); Ulf Palmovist, Stenungsund (SE); Hilkka Knuuttila, Porvoo (FI); Anne Marie Fatnes, Stathelle (NO)

(73) Assignee: Borealis Technology Oy, Porvoo (FI)

( * ) Notice: Subject to any disclaimer, the term of this patent is extended or adjusted under 35 U.S.C. 154(b) by 24 days.

(21) Appl. No.: 09/728,789

(22) Filed: Dec. 5, 2000

(65) Prior Publication Data

US 2001/0025092 A1 Sep. 27, 2001

Related U.S. Application Data

(63) Continuation-in-part of application No. 08/945,419, filed as application No. PCT/FI96/00242 on May 2, 1996, now abandoned.

(30) Foreign Application Priority Data

May 2, 1995 (FI) .................................................. 952097

(51) Int. Cl.$^7$ ............................. C08F 4/02; C08F 4/642; C08J 5/00; B29C 43/08
(52) U.S. Cl. ...................... 264/503; 264/114; 264/310; 264/311; 264/331.15; 526/129; 526/160
(58) Field of Search ................................ 264/503, 114, 264/310, 311, 331.15; 526/129, 160

(56) References Cited

U.S. PATENT DOCUMENTS

| | | | |
|---|---|---|---|
| 4,508,859 A | | 4/1985 | Muhle et al. |
| 4,906,428 A | | 3/1990 | Kelly |
| 5,147,949 A | * | 9/1992 | Chang .................. 526/129 |
| 5,232,644 A | | 8/1993 | Hammond et al. |
| 5,359,015 A | * | 10/1994 | Jejelowo ................ 526/114 |
| 5,608,019 A | * | 3/1997 | Cheruvu et al. ........... 526/129 |
| 5,712,353 A | * | 1/1998 | Poirot et al. ............. 526/88 |

FOREIGN PATENT DOCUMENTS

| | | |
|---|---|---|
| EP | 205159 | 12/1986 |
| EP | 229413 | 7/1987 |
| EP | 295312 | 12/1988 |
| EP | 436326 A1 | 7/1991 |
| EP | 499093 A3 | 8/1992 |
| EP | 516458 A2 | 12/1992 |
| FI | 920405 | 7/1992 |
| WO | 9323439 | 11/1993 |
| WO | 9414856 | 7/1994 |
| WO | WO 94/21691 * | 9/1994 |

OTHER PUBLICATIONS

Research Disclosure, Disclosed Anonymously, Sep. 1993, #35334.
Fahey, D., Metallocene catalysts: a revolution in olefin polymerization, public presentation to the US Patent and Trademark Office. (Nov. 1995).

* cited by examiner

Primary Examiner—David W. Wu
Assistant Examiner—R. Rabago
(74) Attorney, Agent, or Firm—Birch, Stewart, Kolasch & Birch, LLP

(57) ABSTRACT

Rotational moulding process for polymerizing or copolmerizing ethylene for manufacturing ethylene polymers or copolymers having a controlled particle size and morphology. Ethylene is polymerized or copolymerized under ethylene polymerizing conditions in the presence of a supported metallocene catalyst, where the average particle size of the catalyst particles is selected within the range of 14–40 μm and the residence time at the polymerization is selected so as to achieve a polymer where average particle size is between 0.2–0.5 mm and the proportion of fractions between 0.1–0.6 is at least 80%.

6 Claims, 1 Drawing Sheet

(1 of 1 Drawing Sheet(s) Filed in Color)

MICROSCOPY PICTURES SHOWING SURFACE STRUCTURE AND POLYMER MORPHOLOGY

LIGHT MICROSCOPY MICROGRAPH SHOWING THE DIFFERENCE IN MORPHOLOGY BETWEEN SINGLE SITE MATERIAL AND CONVENTIONAL MATERIAL

SEM MICROGRAPH SHOWING THE DIFFERENCE IN SURFACE MORPHOLOGY BETWEEN SINGLE SITE MATERIAL AND CONVENTIONAL MATERIAL

EXAMPLE 10　　　　　EXAMPLE 12

ROTATIONAL MOULDING PROCESS OF ETHYLENE POLYMERS OR COPOLYMERS HAVING A CONTROLLED PARTICLE SIZE AND MORPHOLOGY

This application is a continuation-in-part of U.S. Ser. No. 08/945,419 filed on Feb. 9, 1998 which is the national phase of PCT international application Ser. No. PCT/FI96/00242 which has an international filing date of May 2, 1996 which designated the United States, the entire contents of which are hereby incorporated by reference.

TECHNICAL FIELD OF THE INVENTION

The invention is related to an improved rotational moulding process of ethylene polymers or copolymers and to ethylene polymers having a controlled particle size and morphology. The invention is also related to a method for the manufacture of polymers, which are useful in such applications, where proper particle size and good morphology are mandatory requirements.

BACKGROUND OF THE INVENTION

Rotational moulding is a process where hollow plastic articles can be produced. In the process very fine plastic powder is loaded into a slit, hollow metal mould. Then the mould is rotated round the equatorial and polar axes while the polymer powder is heated above its melting point. When the melted plastic covers the inside surface of the mould, the assembly is cooled to room temperature and the part removed.

The properties of the final article can be influenced by the choice of the plastic material used as raw material, the plastic powder characteristics and the process parameters, such as heating temperature, heating time, cooling time and other conditions. Especially the polymer powder characteristics are very important parameters.

Good moulding resins for rotational moulding resins should satisfy, among others, the following criteria:

The granules must be free flowing, substantially spherical in shape and free of any tails or hairs, which could decrease the flowability of the resin, The particle size should be relatively small and the particle size distribution of the polymer particles should be relatively narrow, and The bulk density of the granules should be high to provide good flowability and close compaction in the mould.

According to the conventional prior art the polymers for rotational moulding have been prepared by first melt compounding the polymerization reactor product and by pelletizing to granules. Additives are often melt compounded with the polymer in this step. Then the pellets are ground and classified to proper particle size. The pelletizing and grinding operations are costly because of high energy consumption, and they frequently produce also irregularly shaped particles, which impede flowability and reduce bulk density.

Polymer products obtained by using Ziegler-Nata catalysts contain very much fine particles ("fines"), which may cause dust explosions and are thus not suitable for rotational moulding. The use of reactor "fluff" coming out from the polymerization reactor has also been studied for the rotational moulding process. However this typically produces polymer particles having too large particle size and wide particle size distribution. Therefore it has not been possible to produce good polyethylene resins for rotational moulding process in this way. Another solution to avoid the problems above has been disclosed in U.S. Pat. No. 4,408,859.

According to this patent the polymer fluff is blended with additive materials for making a masterblend, this masterblend is mixed in an intensive mixer with additional thermoplastic granules below the softening point and the mixing is continued until at least 80% of the granules are smaller than about 30 mesh and the bulk density has been increased by at least 10% over unfinished granules. Thereafter the mixture is allowed to cool and a substantial part of the particles larger than 30 mesh is removed. Though eliminating the melt compounding, pelletizing and grinding steps according to the conventional technique, this method only replaces these steps with other energy consuming operations and does not make it possible to manufacture polymers for rotational moulding process straight in the polymerization reactor without any additional need to reduce the polymer particle size.

SUMMARY OF THE INVENTION

The object of the invention is a rotational moulding process of ethylene polymers or copolymers having a controlled particle size and morphology. The polyethylene resin is produced in a polymerization reactor in such form, that it can be used without any additional operations for rotational moulding processes, where controlled particle size and good morphology are essential. Another object of the invention is to provide a polymerization process, which produces in particle form such polyethylene, which is applicable for rotational moulding process without need for additional pelletizing, grinding or intensive mixing steps.

According to the invention it has been found that the objects above can be achieved by carefully making certain selections related to the catalyst type, catalyst particle size and particle size distribution.

DESCRIPTION OF THE DRAWINGS

The file of this patent contains at least one drawing executed in color. Copies of this patent with color drawings are provided to the Patent and Trademark Office with payment of the necessary fee.

DETAILED DESCRIPTION OF THE INVENTION

Figure 1:
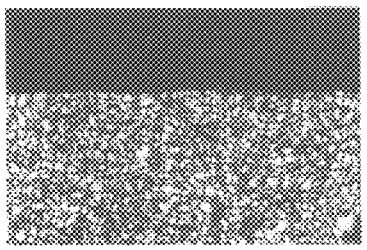
FIG. 1 contains microscopy pictures showing surface structure and polymer morphology of materials produced by Inventive Example 10 and Comparative Example 12.
Figure 1:
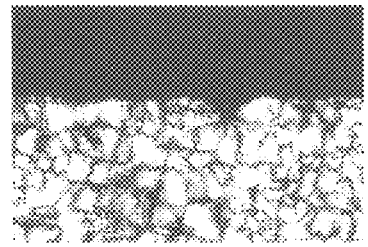
Figure 1:
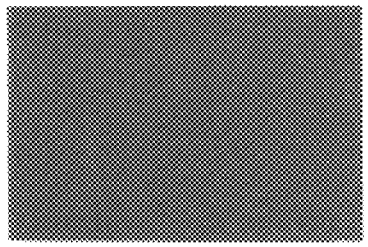
Figure 1:
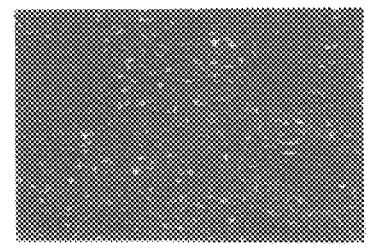

Thus the rotational moulding process of ethylene polymers or copolymers having a controlled particle size and morphology according to the invention is characterized in that the process comprises following steps:

1) Polymerizing or copolymerizing ethylene under ethylene polymerizing conditions in the presence of a supported metallocene catalyst having an average particle size within the range of 10–40 $\mu$m and selecting the residence time at the polymerization so as to achieve a polymer having an average particle size between 0.2.–0.5 mm and the proportion of fractions between 0.1 and 0.6 mm being at least 80%, and the metallocene catalyst being supported on a carrier, which is selected from alumina, silica or silica-alumina, and 2) Rotation moulding of the polymer achieved in 1) without additional pelletizing, grinding or intensive mixing steps.

According to the invention it has been surprisingly found that by using metallocene catalysts having certain properties it is possible to manufacture polyethylene resins having the desired particle properties directly in the polymerization reactor without need for additional grinding or intensive mixing steps. These polyethylene resins further have suitable melt flow and strength properties, which are required in certain special applications, such as rotational moulding process. Thus metallocene catalysts produce spherical, free flowing polymer granules, the polymer particle size distribution is narrow and the bulk density of the powder is high and polymer powder morphology can be controlled with catalyst.

The extra advantage over polymers produced with Zieger-Natta catalysts is that the metallocene catalyst used in the invention produces polymers with narrow molecular weight distribution and very even comonomer distribution, giving narrow melting range and low zero shear viscosity. These altogether result in improved sintering in rotomolding and faster processing with shorter processing times.

Polymer morphology with improved consistency and improved (narrow) particle size distribution yields rotomolding products with very smooth surface and/or surface structure and even crystal structure with improved impact properties, e.g. high dart drop impact values with high elongation at break, and both are achieved at reduced cycle time which means shorter heating/cooling time than for conventional processes.

Extrusion and pelletizing of polymers produced with metallocene catalyst is difficult due to narrow molecular weight distribution and low shear thinning. With this invention these problems can be avoided since the whole extrusion process is omitted.

While it is known for example from Research Disclosure No. 35334 (September 1993/pages 603–611) that metallocene catalysts can be applied to achieve some of the properties mentioned earlier, the products made according to this publication have been made by conventional grinding. Further this publication gives very little information about the catalyst properties.

To produce a certain polymer particle size there are some process factors influencing on polymer particle formation process. At the first, the catalyst particle size will effect on polymer particle size and morphology. By increasing average particle size the polymer particle size is also increased. A suitable particle size is 0.2–0.5 mm, preferably 0.3–0.4 mm. The amount of fines in polymer is reduced when catalyst particle has good morphology. The proportion of the fractions between 0.1 mm and 0.6 mm is at least 80%. Good morphology is attained when all active components (metallocene and methylalumoxane) are fixed and kept inside porous silica particle. Especially good polymer morphology is attained with spherical catalyst particles which give spherical polymer particles having narrow particle size distribution. The most favourable catalyst particle size for rotational moulding applications will be 10–40 $\mu$m, preferably 14–40 $\mu$m.

The density of the polymers is controlled by addition of conomomers to the polymerization. Suitable comonomers to be used according the invention are $C_3$–$C_8$ olefins, preferably butene or 1-hexene.

As a catalyst a metallocene type catalyst is used. As metallocene compounds it is possible to use any kind and type of metallocene. Thus suitable metallocene compounds are those which have a formula $(R_nCp)_mMR'_oX_p$, where $C_p$ is an unsubstituted or substituted and/or fused homo or heterocyclopentadienyl, R is a substituent of Cp ring and a group having 1–4 carbon atoms and bridging two $C_p$ rings, M is a transition metal of group 4A, 5A or 6A (Hubbard), R' is $C_1$–$C_2$ hydrocarbyl or hydrocarboxy group and X is a halogen atom, wherein m is 1–3, n is 0 or 1, o is 0–3 and p is 0–3 and sum m+o+p corresponds to the oxidation state of the transition metal M. The transition metal M is preferably zirconium, hafnium or titanium, most preferably zirconium. Examples of suitable metallocene compounds are, among other things, bis(n-butyl-cyclopentadienyl)zirconium dichloride and bis(indenyl)zirconium chloride.

The polymerization activity of the catalyst component described above can be increased by known activator compounds, such as alumoxane compounds. One method is to add the alumoxane compound to the metallocene containing catalyst compound. In that case the alumoxane compound is preferably added by an impregnation method, in which a solution of alumoxane compound is impregnated into the catalyst component. The amount of such solution is preferably not greater than the total free pore volume of the catalyst compound already containing the metallocene compound. After impregnation the solvent can be removed for example by evaporation. Another method for applying activator compounds is to add it directly into the polymerization reactor along with the metallocene containing catalyst component.

Suitable activators are for example alumoxane compounds having a formula R—(Al(R)—O)$_n$—AlR$_2$ or (—Al(R)—O—)$_m$, where n is 1–40, m is 3–40 and R is a $C_1$–$C_8$ alkyl group. Preferably R is a methyl group.

The support or carrier material used in the method according to the invention may be any porous, substantially inert support, such as an inorganic oxide or salt. In practice the support used is a fine-grained inorganic oxide such as an inorganic oxide of an element of Group 2(A), 3(B) or 4 of the Periodic Table (Hubbard), most preferably silica, alumina or a mixture or derivative of these. Other inorganic oxides which can be used either alone or together with silica, alumina or silica-alumina, are magnesium oxide, titanium dioxide, zirconium oxide, or aluminum phosphate.

The support used in the method is preferably dry. In general, metal oxide supports also contain surface hydroxyl groups which may react with metallocene or alumoxane. Therefore the support can be dehydrated or dehydroxylated before use. Such treatment may be either a thermal treatment or a reaction between the surface hydroxyl groups of the support and a reagent contacted with it.

Preferable support materials to be used according to the invention are porous silica or alumina carriers. The pore volume is not critical and can be varied within wide limits, but normally in commercial support materials the pore volume is approx. 0.9–3.5 ml/g.

Residence time in the polymerization reactor is another polymerization parameter which has been found to affect onto polymer particle size. By increasing process residence time the polymer particle size will become larger. The residence time is very typical for process and reactor type. Thus according to the invention the residence time in loop slurry reactor is 30–120 min, preferably 40–90 min and in fluidized gas phase reactor residence time is 4–8 hours. When polymer particle size is needed to control, at first rough control is made with choosing correct catalyst particle size and after that more accurate control can be made with controlling residence time of polymerization reactor. In practice, residence time operational window is quite narrow, so big changes can not be made in residence time for controlling polymer particle size.

The invention will be further illustrated by referring to the examples below.

EXAMPLE 1

Catalyst Preparation 1 g Crossfield ES70X silica having a surface area of 273 m$^2$, pore volume of 1.54 ml/g and average particle size of 15 μm, was calcinated at 500° C. and weighed into a septa bottle. 1.5 ml complex of n-butylcyclopentadiene zirconium chloride (11 mg), 30 wt % of methylalumoxane solution (1.15 ml) and dry toluene were added onto silica. After 30 min reaction time evaporation of toluene was started at 25° C. by using nitrogen flow. After 60 minutes the catalyst was ready.

Polymerization 130 mg of solid catalyst powder was introduced into 3 l autoclave type polymerization reactor. 1.8 l of isobutane was used as a polymerization medium. Ethylene partial pressure was 5 bar and total pressure was 17.7 bar at 80° C. 40 ml of 1-hexene was used as a comonomer. After 60 min polymerization the reactor was cooled and ethylene and isobutane were flashed out. The polymer yield was 550 g of LLDPE which gives catalyst activity of 4.2 kg LLDPE/g cat h.

The polymer had an MFR$_2$ of 2.70, MFR$_{21}$ of 42.8 and bulk density of 390 kg/r$^3$. The sieving results were as follows:

| | |
|---|---|
| Fines % | 4.4 |
| Bottom | 1.1 |
| 0.071 | 3.3 |
| 0.10 | 32.2 |
| 0.250 | 35.2 |
| 0.355 | 25.7 |
| 0.8 | 1.3 |
| 2.0 | 1.8 |

The average particle size was 0.37 mm.

EXAMPLE 2

A catalyst was produced as in Example 1 except that silica having an average particle size of 27 μm was used.

The polymerization was carried out as in Example 1. The polymer had an MFR$_2$ of 3.5, MFR$_{21}$ of 46.3 and a bulk density of 425 kg/m$^3$.

The following sieve analysis results were obtained for the polymer:

| | |
|---|---|
| Fines % | 7.7 |
| Bottom | 1.9 |
| 0.071 | 5.8 |
| 0.10 | 27.1 |
| 0.250 | 17.3 |
| 0.355 | 43.1 |
| 0.80 | 4.4 |
| 2.0 | 0.3 |

The average particle size of the polymer was 0.44 mm.

EXAMPLE 3

A catalyst was prepared as in Example 1 except that the silica used had an average particle size of 40 μm. The polymerization was carried out as in Example 1. The polymer yield was 362 g which gives catalyst activity of 2.7 kg polymer/g cat h. The MFR$_2$ was 3.2, MFR$_{21}$ was 52.1 and bulk density was 390 kg/m$^3$. The sieving results were as follows:

| | |
|---|---|
| Fines % | 8.5 |
| Bottom | 2.3 |
| 0.071 | 6.2 |
| 0.10 | 35.1 |
| 0.250 | 18.9 |
| 0.355 | 35.0 |
| 0.80 | 5.3 |
| 2.0 | 0.8 |

The average particle size of the polymer was 0.43 mm.

EXAMPLE 4 (comparative example)

A catalyst was prepared as in Example 1, except that the average particle size of the silica used was 54 μm. The catalyst was used to polymerize ethylene according to Example 1. The polymer yield was 389 g which gives a catalyst activity of 3.2 kg polymer/g cat h. The MFR$_2$ was 3.0 and the bulk density was 408 kg/r$^3$.

| | |
|---|---|
| Fines % | 5.4 |
| Bottom | 3.1 |
| 0.071 | 2.3 |
| 0.10 | 26.3 |
| 0.250 | 16.6 |
| 0.355 | 34.1 |
| 0.80 | 16.7 |
| 2.0 | 0.6 |

The average polymer particle size was 0.56 mm.

EXAMPLES 5–7

Catalyst Preparation 10 g Crossfield ES70X silica (S.A.=273 m$^2$, PV=1,54 ml/g, APS=14 μm), calcinated at 500° C. for 10 hours, was weighed into a septa bottle. 15 ml of complex solution of n-butylcyclopentadiene zirconium dichloride (110 mg), 30 wt-% of methylalumoxane (11.5 ml) and dry toluene (3.5 ml) was added onto silica. After 30 min reaction time evaporation of toluene was started at 25° C. by using nitrogen flow. After 60 minutes the catalyst was ready.

Catalyst Polymerization 127 mg solid catalyst powder was introduced into 3 l autoclave type polymerization reactor. 1.8 l of isobutane was used as a polymerization medium. Ethylene partial pressure was 5 bar and total pressure was 17.7 bar at 80° C. 40 ml of 1-hexene was used as a comonomer. After the polymerization the reactor was cooled and ethylene and isobutane were flashed out.

The results are presented in the accompanying Table.

| | Example 5 | Example 6 | Example 7 |
|---|---|---|---|
| Residence time min | 30 | 90 | 120 |
| Activity kg/g cat h | 4.3 | 1.00 | 1.50 |
| Sieve analysis: | | | |
| Fines % | 6.7 | 5.7 | 6.2 |
| Bottom | 3.9 | 2.6 | 3.6 |
| 0.071 | 2.9 | 3.2 | 2.6 |
| 0.10 | 50.6 | 31.7 | 26.4 |
| 0.250 | 29.4 | 24.3 | 26.3 |
| 0.355 | 11.2 | 27.2 | 34.5 |
| 0.80 | 1.4 | 8,8 | 5.4 |
| 2.0 | 0.8 | 1.9 | 0.5 |

-continued

|  | Example 5 | Example 6 | Example 7 |
|---|---|---|---|
| Average particle Size mm | 0.296 | 0.483 | 0.429 |

EXAMPLE 8

A catalyst was prepared as in Example 1, and the polymerization was carried out as described before.

The average particle size was of the powder was 0.230 mm. The dry flow properties of the powder was 18.2 s/g and bulk density was 445 kg/m³.
Rotomoulding 1.5 kg of the polymer was dry mixed with the ordinary stabilizers and the stabilized polymer powder was then entered into a box mould, and rotomoulding of the polymer was performed in a Rotospeed E60 Express rotomoulding machine. The oven temperature was 270° C. After 10 minutes heating and 20 minutes cooling which was performed with fans for 10 minutes and continued then without fans for 10 minutes, the box was demoulded. Samples for testing was cut from the box.

Elongation at break /100 mm/min) was measured, and it was found to be 350%. Dart impact at –20° C. was measured and the peak force was found to be 1480 N/mm. The inner surface of the rotomoulded box was examined and it was found to be very smooth.

EXAMPLE 9

Catalyst preparation was carried out as in Example 1, with the exception that a silica with APS 39 micron was used. Polymerization was carried out as in the previous example.

The average particle size of the powder was 0.270 mm. The dry flow properties of the powder was 14.5 s/g and bulk density was 450 kg/m³.

Rotomoulding and product evaluation.

Rotomoulding of 1.5 kg of the powder was performed as described in Example 8. Oven temperature of 270° C. was used and the heating time was 10 minutes. Cooling time of 20 minutes was used.

Evaluation of the rotomoulded samples gave the following results:

Elongation at break (100 mm/min) was 300%. Dart impact measured as peak force at –20° C. was found to be 1450 N/mm. The inner surface of the rotomoulded box was examined and found to be very smooth.

EXAMPLE 10

Catalyst preparation and the polymerization was carried out as in Example 1. The dry flow properties of the powder were 15.0 s/g and bulk density was 435 kg/m³.
Rotomoulding and Product Evaluation 1.5 kg of the powder was additivated and rotomoulded as described in Example 8.

Evaluation of the rotomoulded samples gave the following results:

Elongation at break (100 mm/min) was >400%. Dart impact at –20° C. measured as peak force was 1500 N/mm. The inner surface of the rotomoulded box was examined and it was found to be very smooth. This was confirmed by using light microscopy, showing a smooth surface and a very homogenous morphology which is further illustrated in FIG. 1.

EXAMPLE 11 (Comparative Example)

Reference polymer powder was obtained from a commercial gas phase reactor using Ziegler-Natta catalyst. The powder was ground in a Wedco mill to obtain acceptable polymer particle size.

Sieving results after grinding:

| >600 μ | 1.4 |
|---|---|
| 500 μ | 7.0 |
| 425 μ | 39.6 |
| 300 μ | 34.6 |
| 212 μ | 13.3 |
| 150 μ | 3.0 |
| pan | 1.6 |

Bulk density was 335 kg/m³, MFR$_2$=3.5 and density=934 kg/m³. Dry flow properties was measured to 21 seconds/100 grams.
Rotomoulding and Evaluation 2.5 kg of polymer powder was stabilized by dry mixing with additives and rotomoulded as described in Example 8, except that 13 minutes heating time and 25 minutes cooling time was used. Samples for testing was cut from the box.

Dart impact was measured and found to be 1240 N/mm. Elongation at break was 120%.

Even when using a longer processing time/sintering time (13 minutes heating) the reference sample showed lower impact and elongation at break results than the examples of the invention.

The inner surface of the rotomoulded box was also examined and found to have a certain roughness, like the structure of orange peel. This was confirmed by using light microscopy, showing a rough surface and a more non-homogenous morphology.

EXAMPLE 12 (comparative example)

Reference polymer was obtained from a commercial gas phase reactor by using Ziegler-Natta catalyst. The polymer was stabilized before pelletizing, pelletized and ground in a Wedco mill to obtain a good rotomoulding powder.
Polymer Properties:
MFR$_2$=3.5, density=934 kg/m³
Sieving results:

| >600 μ | 0.6 |
|---|---|
| 500 μ | 5.8 |
| 425 μ | 19.7 |
| 300 μ | 34.2 |
| 212 μ | 28.8 |
| 150 μ | 10.7 |
| pan | 0.2 |

Pourability was 23 sec/100 grams. Bulk density was 380 kg/n³.

After a pelletizing step for improving homogenization, rotomoulding was performed as in Example 11 with an increased heating time of 13 minutes and a cooling time of 25 minutes. Dart impact was measured and found to be 1510 N/mm. Elongation at break (100 mm/min) was 90%.

The inner surface of the rotomoulded box was also examined and found to have a certain roughness, like the structure of orange peel. This was confirmed by using light microscopy, showing a rougher surface and a more non-homogenous morphology, which is illustrated in the micrograph presented in FIG. 1.

What is claimed is:

1. Rotational moulding process of ethylene polymers or copolymers having a controlled particle size and morphology, wherein the process comprises following steps:
   1) polymerizing or copolymerizing of ethylene under ethylene polymerizing conditions in the presence of a supported metallocene catalyst having an average particle size within the range of 10–40 μm and selecting the residence time at the polymerization so as to achieve a polymer having an average particle size between 0.2–0.5 mm and the proportion of the fraction between 0.1 mm and 0.6 mm being at least 80%, and the metallocene catalyst being supported on a carrier, which is selected from alumina, silica or silica-alumina, and
   2) rotation moulding of the polymer achieved in 1) without additional pelletizing, grinding or mixing steps.

2. Process according to claim 1, wherein in step 1) the polymer is produced in a slurry polymerization reactor, where the average residence time is 30–120 minutes.

3. Process according to claim 1, wherein in step 1) the polymer is produced in a slurry polymerization reactor, where the average residence time is 40–90 minutes.

4. Process according to claim 1, wherein in step 1) the polymer is produced in a gas phase reactor, where average residence time is 4–8 hours.

5. Process according to claim 1, wherein said metallocene is a metallocene compound having a formula $(R_nCp)_mMR'_oX_p$, where $C_p$ is an unsubstituted or substituted and/or fused homo or heterocyclopentadienyl, R is a substituent of Cp ring and a group having 1–4 atoms and bridging two Cp rings, M is a transition metal group 4A, 5A or 6A (Hubbard), R' is $C_1$–$C_2$ hydrocarbyl or hydrocarboxy group and X is a halogen atom and wherein m is 1–3, n is 0 or 1, o is 0–3, p is 0–3.

6. Rotational moulding product obtained by a process according to claim 1.

* * * * *